United States Patent [11] 3,627,886

[72] Inventor Harold Leon Newmark
Maplewood, N.J.
[21] Appl. No. 721,154
[22] Filed Apr. 15, 1968
[45] Patented Dec. 14, 1971
[73] Assignee Hoffmann-La Roche Inc.
Nutley, N.J.

[54] METHODS OF SOLUBILIZING COUMERMYCIN EMPLOYING UREA, DIMETHYLACETAMIDE OR MIXTURES THEREOF
2 Claims, No Drawings

[52] U.S. Cl. .................................................... 424/181
[51] Int. Cl. ................................................... A61k 21/00
[50] Field of Search ........................................... 260/210;
424/181, 320, 322

[56] References Cited
UNITED STATES PATENTS
3,201,386 8/1965 Kawaguchi et al. ............ 260/210

OTHER REFERENCES
Chem. Abstracts, Vol. 58, pg. 6656c (1963)

*Primary Examiner*—Stanley J. Friedman
*Assistant Examiner*—Vincent D. Turner
*Attorneys*—Samuel L. Welt, Jon S. Saxe, William H. Epstein, Gerald S. Rosen, Bernard S. Leon and William G. Isgro ABSTRACT: A therapeutic composition is described which comprises a mixture of (1) coumermycin and (2) (a) dimethylacetamide, (b) urea or (c) a mixture of dimethylacetamide and urea.

The composition can be formulated into suitable dosage forms for oral administration and, when so administered, satisfactory blood levels are achieved at relatively low dosages.

METHODS OF SOLUBILIZING COUMERMYCIN EMPLOYING UREA, DIMETHYLACETAMIDE OR MIXTURES THEREOF

BRIEF SUMMARY OF THE INVENTION

The present invention provides compositions which contain the known antibiotic coumermycin in admixture with either (a) dimethylacetamide or (b) urea or (c) with a mixture of dimethylacetamide and urea. The compositions are produced simply by mixing coumermycin with dimethylacetamide, urea or with the mixture of dimethylacetamide and urea. Subsequently, the compositions are worked-up, by conventional procedures and techniques, into a dosage form suitable for oral administration.

The invention serves to provide oral dosage forms from which high levels of coumermycin, an antibiotic known to be effective in the treatment of certain bacterial infection, are absorbed into the blood stream, even when administered at low dosages.

BACKGROUND OF THE INVENTION

The antibiotic coumermycin is produced by culturing *Streptomyces hazeliensis* var. *hazeliensis* nov. sp., an organism isolated from a sample of soil obtained in Matane, Gaspe, Canada. A culture of the organism has been deposited in the collection of micro-organisms in the U.S. Department of Agriculture, Northern Utilization Research and Development Division, Peoria, Ill. under Reg. No. NRRL 2938.

Processes for producing the antibiotic, described, for example, in Belgian Pat. No. 665,237, Dec. 10, 1965, result in a crude complex of antibiotic compounds. At least five active components and an inactive fraction can be isolated from this complex. Of the active components, the compound denoted coumermycin $A_1$ is the most active. Coumermycin $A_1$ is fully methylpyrollated and it has the following formula:

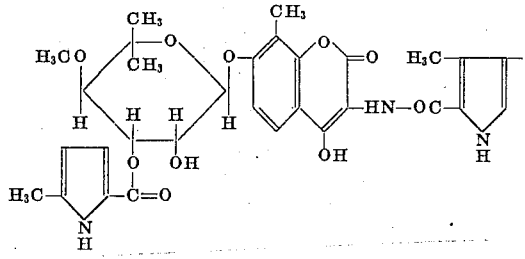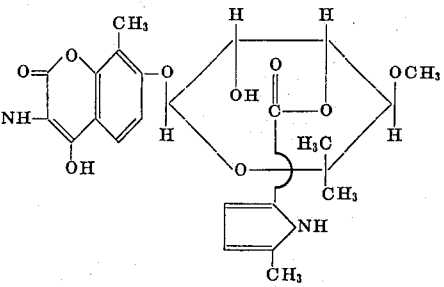

The utility of coumermycin has, in the past, been limited by its poor and inconsistent absorption into the blood stream from the gastrointestinal tract when administered orally. Accordingly, in order to offset the undesirably absorption characteristics of the drug, it has been necessary to administer coumermycin in high oral dosages in order to achieve therapeutically effective blood levels. This solution to the problem, however, leaves much to be desired since inherent in the administration of high dosages of coumermycin is the risk of severe toxic reactions, e.g., gastrointestinal disturbances.

DETAILED DESCRIPTION

The present invention provides new and useful compositions which contain coumermycin as the active ingredient.

More particularly, the invention provides coumermycin-containing compositions which are suitable for oral administration.

In its most specific embodiment, the invention provides coumermycin-containing pharmaceutical compositions, in unit dosage form, which compositions are especially characterized in that, when administered orally even at relatively low dosages, high blood levels are achieved.

The compositions of the invention are mixtures comprising (1) coumermycin and (2) (a) dimethylacetamide or (b) urea or (c) a mixture of dimethylacetamide and urea. The compositions may contain also, as optional components, other materials, of the type described hereinafter, which, in some instances at least, appear to complement the blood level enhancing properties of dimethylacetamide and/or urea. Additionally, the compositions may contain conventional pharmaceutical excipients and adjuvants.

In carrying out the invention, any therapeutically active component of the coumermycin complex can be used. Such component can be in the form of the free acid or in the form of a salt of the free acid. Thus, suitable for use are salts of coumermycin, such as, alkali metal salts, for example, sodium, potassium and lithium. Additionally, amine salts of coumermycin free acid, for example, the diethanolamine salt or the triethanolamine salt of coumermycin can be used. In the preferred embodiment of the invention, coumermycin $A_1$, either the free acid or an alkali metal salt thereof, for example, the monosodium salt, is employed. It is to be understood that the previously mentioned salts of coumermycin are merely illustrative of the salts which can be employed in the practice of the invention and such listing is not intended as limitative on the practice of the invention. In general, one can use a salt of coumermycin free acid with any medicinally acceptable base. In the paragraphs which follow, the term coumermycin will be used to denote, collectively and individually, the active components of the coumermycin complex both in the form of the free acid and in the form of salts thereof with a medicinally acceptable base.

The compositions of the invention are readily produced. The preparative method involves simply mixing or dissolving coumermycin with dimethylacetamide, urea or with a mixture of dimethylacetamide and urea. Generally, the mixing step is carried out without the aid of a solvent. However, if desired, the ingredients can be admixed in a liquid vehicle which is a solvent for both. In those instances in which urea is used as the blood level enhancing agent, the urea may be melted by heating to approximately 132° C., and the coumermycin dissolved in the melt. Cooling and grinding the solid mass gives fine particles with good absorption properties. The quantity of coumermycin and the quantity of dimethylacetamide and/or urea which is used in producing the compositions is variable within certain prescribed limits. In general, the compositions of the invention will contain from about 0.1 part by weight to about 50 parts by weight of dimethylacetamide, urea or mixture of dimethylacetamide and urea for each part by weight of coumermycin present. The compositions which are produced in the preferred embodiment of the invention, however, will contain from about 1 part by weight to about 10 parts by weight of dimethylacetamide, urea or mixture of dimethylacetamide and urea for each part by weight of coumermycin present.

The compositions of this invention, i.e., the mixture of coumermycin with dimethylacetamide or with urea or with the mixture of dimethylacetamide and urea, are ultimately worked-up to provide pharmaceutical preparations which are suitable for oral administration. These pharmaceutical preparations may be in solid form, for example, tablets, dragees or capsules. The tablets can be single or multilayer and/or they may be coated. In the alternative, the preparations may be in liquid form, for example, solutions, emulsions or suspensions. In producing these pharmaceutical preparations, conventional pharmaceutically acceptable adjuvants and excipients, either organic or inorganic in nature, are employed. Such adjuvants and excipients include water, gelatin, lactose, starches, magnesium stearate, talc, vegetable oils, gums, petroleum jellies, glycerol, ethyl alcohol, propylene glycol and other such materials. The methods and techniques as well as the adjuvants and excipients which are used in formulating the compositions of the present invention into particular solid oral dosage forms will be readily apparent to those skilled in the art. For example, the compositions, with or without appropriate pharmaceutical excipients and adjuvants, can be filled into hard or soft shell capsules. In the alternative, the compositions can be compressed into tablets which can, if desired, be film-coated or sugar-coated. The manner in which the present compositions are formulated into liquid pharmaceutical preparations, e.g., solutions for oral administration, will similarly be apparent to persons skilled in the art. For example, in producing solutions, the mixture of coumermycin with dimethylacetamide or with urea or with a dimethylacetamide-urea mixture can be dissolved in a pharmaceutically acceptable solvent. In an alternate embodiment of the invention, coumermycin and dimethylacetamide or urea or the dimethylacetamide-urea mixture can be added separately to the pharmaceutical excipients or adjuvants, either liquid or solid to form, in situ, the desired mixture of medicament and blood level enhancing agent or agents.

In addition to the essential components enumerated heretofore, the compositions of the invention can contain other ingredients, some of which appear to complement the ability of dimethylacetamide and/or urea to achieve high blood levels of coumermycin. Such ingredients include, for example, organic carboxylic acid and salts of organic carboxylic acids. Among the acids which can be used, as optical components in the practice of the invention, are aliphatic monocarboxylic acids having a carbon chain length of two to 20 carbon atoms, such as, acetic acid, propionic acid, oleic acid, stearic acid, lauric acid, etc. Salts of gluconic acid, for example, sodium gluconate can also be employed. Additionally, vegetable oils, such as, corn oil, safflower oil, as well as mono-, di-, and triesters of glycerol, for example, glyceryl monooleate, glyceryl monostearate, glyceryl dioleate, glyceryl triacetate, etc., can be used in admixture with dimethylacetamide and/or urea. Furthermore, the invention contemplates the use of polyoxyethylene sorbitan esters, for example, polyoxyethylene 20 sorbitan monooleate which is commercially available under the trade name Tween 80, polyoxyethylene 20 sorbitan monostearate which is commercially available under the trade name Tween 60 and certain polyoxyethylene ethers, for example, polyoxyethylene ether of caster oil which is commercially available under the trade name Emulphor EL 620, in combination with dimethylacetamide and/or urea. Additionally, polyethylene glycols; products produced by condensing ethylene oxide with a propylene glycol-propylene oxide condensate; and N-methyl glucamine, can be used in admixture with dimethylacetamide and/or urea. The amount of optional ingredients used in the practice of the invention is variable within certain prescribed limits. Generally, however, it is preferred that the quantity of such optional ingredients present in the compositions does not exceed the weight of dimethylacetamide and/or urea used.

The quantity of inert pharmaceutical excipients and adjuvants used in producing various dosage forms will vary depending upon the properties and characteristics of the excipients or adjuvants in use and the nature of the dosage form to be formulated. In general, however, pharmaceutical preparations of the present invention, in unit dosage form, will provide from about 10 mg. of coumermycin to about 400 mg. of coumermycin. The frequency with which the pharmaceutical preparations of this invention are administered will vary depending upon the level of active medicament present therein and the needs and requirements of the subject to be treated. In general, however, in the case of capsules or tablets containing 50 mg. of coumermycin, a typical adult dose is one tablet or capsule four times daily or every 6 hours. In the case of a capsule or tablet containing 100 mg. of coumermycin, a typical adult dose of such capsule or tablet would be one capsule every 12 hours or twice daily. It should be understood, however, that the dosages enumerated herein are exemplary only and that they are not intended to limit the scope or practice of the present invention. In any particular instance, the dosage can be adjusted to satisfy the needs and requirements of the subject to be treated.

The present invention serves to provide pharmaceutical compositions, in unit dosage form, which contain coumermycin as the active ingredient. The compositions, thus produced, are suitable for use in the oral treatment of microbial infections. When so used, high blood levels will be achieved even at relatively low dosages. The invention, therefore, is of significant importance since it provides means whereby coumermycin can be self-administered by the subject, with the assurance that the active ingredient will be absorbed reliably and consistently into the blood stream. In the past, administration of coumermycin in the absence of medically trained personnel, was not feasible due to the relatively high dosages of coumermycin required to achieve therapeutically effective blood levels, reliably and consistently.

For a fuller understanding of the nature and objects of this invention, reference may be had to the following examples which are given merely as further illustrations of the invention and are not to be construed in a limiting sense.

EXAMPLE 1

In this example, 100 parts by weight of the monosodium salt of coumermycin were dissolved in 400 parts by weight of dimethylacetamide. The solution, thus obtained, was filled into hard shell gelatin capsules to provide capsules, each of which contained 100 mg. of the monosodium salt of coumermycin and 400 mg. of dimethylacetamide.

The solution, produced as described in the preceding paragraph was administered orally to dogs and blood level determinations were made at specific intervals. The blood assays were performed by microbiological cup-plate assay method using Staphylococcus aureus as the test organism. The blood level determinations were made 1, 2, 4, 7 and 24 hours after oral administration of the capsules. For control purposes, capsules containing 50 mg. of the monosodium salt of coumermycin and no dimethylacetamide were also administered orally to a dog and blood level determinations were made at 2 and 4 hours after oral administration.

The table which follows hereinafter, sets forth the results of the blood level determinations.

|  | Dose, mg./kg. | Blood level, mcg./ml., hours after administration | | | | |
| --- | --- | --- | --- | --- | --- | --- |
|  |  | 1 | 2 | 4 | 7 | 24 |
| Product of— |  |  |  |  |  |  |
| Example 1 | 50 | 0.1 | 0.3 | 30 | 3 | 1 |
| Control | 5 |  | 0.4 | 0.6 |  |  |

The foregoing results demonstrate that the oral administration of coumermycin in the form of a solution in dimethylacetamide enhances the absorption of the active medicament into the blood stream.

EXAMPLE 2 a. In this example, a composition was produced by mixing 50 parts by weight of the monosodium salt of coumermycin with 300 parts by weight of urea. The dry mixture was filled into hard shell gelatin capsules to provide capsules, each of which contained 50 mg. of the monosodium salt of coumermycin and 300 mg. of urea.

b. A second composition was produced using 50 parts by weight of the monosodium salt of coumermycin and 250 parts by weight of urea. In this instance, the mixture of monosodium salt of coumermycin and urea was heated to a temperature above its melting point, following which the molten mass was cooled to room temperature. The solid product, which was obtained on cooling, was comminuted to provide small particles. The product was filled into hard shell gelatin capsules to provide capsules, each of which contained 50 mg. of the monosodium salt of coumermycin and 250 mg. of urea.

c. A third was produced by heating to a temperature above its melting point, a mixture of 10 parts by weight of the monosodium salt of coumermycin and 50 parts by weight of urea. The mixture was allowed to cool to room temperature, following which the solid product, thus obtained, was comminuted to relatively fine particles. These particles were filled into hard shell gelatin capsules to provide capsules, each of which contained 10 mg. OF the monosodium salt of coumermycin and 50 mg. of urea.

d. The compositions, produced as described in paragraphs (a) to (c), inclusive, of this example, were administered orally to dogs and blood level determinations were made at specific intervals. The blood assays were performed by microbiological cup-plate assay method using Staphylococcus aureus as the test organism. The blood level determinations were made 1, 2, 4, 7 and 24 hours after oral administration of the capsules. For control purposes, capsules containing 50 mg. of the monosodium salt of coumermycin and no urea were also administered orally to dogs and blood level determinations were made at 2 and 4 hours after oral administration.

The table which follows hereinafter, sets forth the results of the blood level determinations.

| | Dose, mg./kg. | Blood level, mcg./ml., hours after administration | | | | |
|---|---|---|---|---|---|---|
| | | 1 | 2 | 4 | 7 | 24 |
| Product of— | | | | | | |
| Example 2(a) | 5 | | 2.5 | 0.08 | | |
| Example 2(b) | 5 | | 3 | 3 | | |
| Example 2(c) | 1 | | 1.5 | 1.5 | | |
| Control | 5 | | 0.4 | 0.6 | | |

The foregoing results demonstrate that the oral administration of coumermycin in combination with urea enhances the absorptions of the active medicament into the blood stream.

EXAMPLE 3

In this example, a mixture was prepared using 100 parts by weight of coumermycin monosodium salt, 300 parts by weight of dimethylacetamide and 100 parts by weight of oleic acid. The mixture, thus produced, was filled into hard shell gelatin capsules and it was administered orally to dogs. Blood level determinations were carried out in the manner described in example 1. A control experiment was run using hard shell capsules containing 50 mg. of coumermycin monosodium salt and no dimethylacetamide oleic acid.

The table which follows sets forth the results of the blood level determinations.

| | Dose, mg./kg. | Blood level, mcg./ml., hours after administration | | | | |
|---|---|---|---|---|---|---|
| | | 1 | 2 | 4 | 7 | 24 |
| Product of— | | | | | | |
| Example 3 | 50 | 10 | 3 | 3 | 1 | 0.1 |
| Control | 5 | | 0.4 | 0.6 | | |

EXAMPLE 4

In this example, the products were prepared by mixing the hereinafter indicated ingredients, in the quantities designated, and filling and mixtures thus obtained into hard shell gelatin capsules.

| Ingredients | Quantity mg./capsules | | | | |
|---|---|---|---|---|---|
| | 1 | 2 | 3 | 4 | 5 |
| Monosodium salt of coumermycin | 100 | 100 | 100 | 50 | 10 |
| Dimethylacetamide | 250 | 250 | 250 | 200 | 200 |
| Tween 80 | 250 | | | | |
| Emulphor EL-620 | | 250 | | | |
| Pluronic F-68 | | | 250 | | |
| Urea | | | | 250 | 250 |

The products, thus obtained, were administered orally to dogs and blood level determinations were made as described in example 1. For control purposes, capsules containing 50 mg. of the monosodium salt of coumermycin and no blood level enhancing agent were administered orally to dogs and blood level determinations were made 2 to 4 hours after oral administration. The results of such determinations are set forth in the table which follows:

| | Dosage, mg./kg. | Blood levels, mcg./ml., hour after administration | | | | |
|---|---|---|---|---|---|---|
| | | 1 | 2 | 4 | 7 | 24 |
| Product No.— | | | | | | |
| 1 | 50 | 2.7 | 2.7 | 2.7 | | 1 |
| 2 | 50 | 3.3 | 3.3 | 10 | 10 | 3 |
| 3 | 50 | 3 | 3 | 3 | 1 | 1 |
| 4 | 5 | | | 3 | | |
| 5 | 1 | [1]ND | | 3 | | |
| Control | 5 | | 0.4 | 0.6 | | |

[1] ND=Nondetectable (i.e., below 0.08 mcg./ml).

EXAMPLE 5

In this example, the products were prepared by mixing the hereinafter indicated ingredients, in the quantities designated, and subsequently filling such mixtures into hard shell gelatin capsules.

| Ingredients | Quantity, mg./capsule | | |
|---|---|---|---|
| | 1 | 2 | 3 |
| Monosodium salt of coumermycin | 50 | 50 | 50 |
| Dimethylacetamide | 200 | 200 | 200 |
| Triacetin | 300 | | |
| Medium chain triglyceride [1] | | 300 | |
| Corn oil | | | 300 |
| Water | | | |

[1] Medium Chain Triglycerides—a selected liquid fraction made from coconut oil. Available from Drew Chemical Company.

The foregoing mixtures were administered orally to dogs and blood level determinations were carried out as described in example 1. For control purposes, capsules containing 50 mg. of the monosodium salt of coumermycin and no blood level enhancing agent were also administered to dogs and blood levels were determined. The results of such determinations are set forth in the table which follows:

| | Dosage, mg./kg. | Blood levels, mcg./ml., hours after administration | | | | |
|---|---|---|---|---|---|---|
| | | 1 | 2 | 4 | 7 | 24 |
| Product No.— | | | | | | |
| 1 | 5 | | 0.15 | 1.3 | | |
| 2 | 5 | 1 | 30 | 10 | | |
| 3 | 5 | | 0.3 | 2.5 | | |
| Control | 5 | | 0.4 | 0.6 | | |

EXAMPLE 6

In this example, an elixir-type solution was prepared by charging the following named ingredients into a suitable vessel to provide a product containing, per ml. of solution, 25 mg. of the monosodium salt of coumermycin, 9 percent by weight of dimethylacetamide, 35 percent by weight of polyethylene glycol, 35 percent by weight of ethyl alcohol and 10 percent by weight of water. The solution was administered orally to dogs in a dosage of 50 mg./kg. of body weight and blood levels were determined 1, 2, 4, 7 and 24 hours after oral administration. The results of the blood level determinations were as follows:

| | |
|---|---|
| 1 hour | 0.3 mcg./ml. |
| 2 hours | 1.3 mcg./ml. |
| 4 hours | 2.5 mcg./ml. |
| 7 hours | 0.04 mcg./ml. |
| 24 hours | 0.04 mcg./ml. |

EXAMPLE 7

In this example, 50 parts by weight of the monosodium salt of coumermycin was mixed with 15 parts by weight of anhydrous aluminum chloride to form an aluminum salt complex of coumermycin. Thereafter, the complex was added to 400 parts by weight of dimethylacetamide which contained 25 parts by weight of sodium gluconate. The product, thus obtained, was filled into hard shell capsules, to provide capsules each of which contained the equivalent of 50 mg. of the monosodium salt of coumermycin.

The product produced as described in the preceding paragraph, was administered orally to dogs and blood level determinations were carried out as described in example 1. For control purposes, capsules containing 50 mg. of the monosodium salt of coumermycin and no dimethylacetamide or sodium gluconate were also administered orally to dogs and blood levels were subsequently determined. The results of the blood level determinations are set forth in the table which follows:

| | Dose, mg./kg. | Blood levels, mcg./ml., hours after administration | | | | |
|---|---|---|---|---|---|---|
| | | 1 | 2 | 4 | 7 | 24 |
| Product of— | | | | | | |
| Example 7 | 50 | 0.3 | 1.3 | 2.5 | 0.04 | 0.04 |
| Control | 5 | ----- | 0.4 | 0.6 | ----- | ----- |

EXAMPLE 8

In this example, a product was prepared by mixing 50 parts by weight of the monosodium salt of coumermycin, 100 parts by weight of urea and 100 parts of N-methylglucamine. The mixture was filled into hard shell gelatin capsules to provide capsules, each of which contained 50 mg. of the monosodium salt of coumermycin, 100 mg. of urea and 100 mg. of N-methylglucamine.

The composition of this example was administered orally to dogs and blood level determinations were carried out in the manner described in example 1. For control purposes, capsules containing 50 mg. of the monosodium salt of coumermycin and no urea or N-methylglucamine were also administered orally to dogs and blood levels were determined. The results of such determinations are set forth in the table which follows:

| Product of | Dose mg./kg. | Blood Levels mcg./ml. Hours After Administration | |
|---|---|---|---|
| | | 3 | 6 |
| Example 8 | 5 | 2.6 | 1.8 |
| Control | 5 | 0.4 | 0.6 |

I claim:

1. A method for increasing the absorption of orally administered coumermycin into the blood stream from the gastrointestinal tract which comprises the oral administration of an effective amount of a compositions consisting of an active ingredient selected from the group consisting of:
   a. the product of admixing from about 0.1 part to about 50.0 parts by weight dimethylacetamide and one part by weight of a coumermycin free acid or a salt thereof with a medicinally acceptable base;
   b. the product of heating in admixture from about 0.1 part to about 50.0 parts by weight of urea and one part by weight of a coumermycin free acid or a salt thereof with a medicinally acceptable base to a temperature sufficient to melt said urea, cooling said mixture to form a solid and comminuting said solid; and
   c. the product of admixing from about 0.1 parts by weight to about 50.0 parts by weight of a mixture of dimethylacetamide and urea and one part by weight of a coumermycin free acid or a salt thereof with a medicinally acceptable base; and a pharmaceutically acceptable carrier therefor.

2. The method of claim 1 wherein the coumermycin free acid in said active ingredient is coumermycin $A_1$ free acid.

* * * * *